United States Patent [19]

Weaver et al.

[11] Patent Number: 4,965,037

[45] Date of Patent: Oct. 23, 1990

[54] METHOD OF MOLDING A COMPOSITE

[75] Inventors: William R. Weaver; James E. Matzinger, both of Toledo, Ohio

[73] Assignee: Libbey-Owens-Ford Co., Toledo, Ohio

[21] Appl. No.: 380,888

[22] Filed: Jul. 17, 1989

[51] Int. Cl.$^5$ .............................................. B29C 45/14
[52] U.S. Cl. ..................... 264/511; 264/261; 264/265; 264/266; 264/267
[58] Field of Search ............... 264/266, 261, 511, 265, 264/267

[56] References Cited

U.S. PATENT DOCUMENTS

| | | | |
|---|---|---|---|
| 2,313,985 | 3/1943 | Bradshaw | 264/266 |
| 3,000,058 | 9/1961 | Thielen, Jr. | 264/266 |
| 4,207,278 | 6/1980 | Cowen et al. | 264/266 |
| 4,369,157 | 1/1983 | Conner | 264/266 |
| 4,376,748 | 3/1983 | van Erven | 264/261 |
| 4,785,523 | 11/1988 | Koseki et al. | 264/259 |

Primary Examiner—James Lowe
Attorney, Agent, or Firm—Marshall & Melhorn

[57] ABSTRACT

Molded composites, useful for manufacturing for example entry way doors, furniture components, building decorative or structural components, etc., are produced by a process in which a substrate and surface finishing film are placed in a mold, the mold is closed, and reactive polymeric precursors are injected between the substrate and the surface finishing film. The injection pressure and the autogenous pressure incident to the curing of the reactive polymeric precursors deform the surface finishing film into intimate contact with a surface of the mold cavity, and simultaneously the polymeric precursors chemically bond to the surface finishing film.

27 Claims, 2 Drawing Sheets

METHOD OF MOLDING A COMPOSITE

FIELD OF THE INVENTION

The present invention relates generally to molded composite, and more particularly, to a process for producing a molded composite material which may be formed into an entry way door, furniture component, or architectural component.

BACKGROUND OF THE INVENTION

Methods for producing molded composites, employing polymeric and either metallic or non-metallic materials, useful for example for making entry way doors or furniture components, are well known in the art. Typically, such molded composites are manufactured by reactive molding processes, such as for example polyurethane reaction injection molding (RIM) in which a polyisocyanate, a polyol, and a chain extender are brought together in a single operation (the polyol and chain extender may be preblended if desired) and immediately injected into a mold cavity containing a metallic or non-metallic insert upon which the curing polyurethane forms a decorative shell. The insert or substrate reduces the amount of polyurethane precursor materials which must be injected, and additionally provides structural support for the finished molded composite. Other methods for producing molded composites include gel coat processes in which a polymeric material intended to form the exposed surface of the article is sprayed into the mold cavity. An alternative method is the sheet molding process in which a fibrous impregnated prepreg is placed in a mold cavity and shaped by heat and pressure into the desired configuration.

The processes disclosed in the prior art result in finished surfaces which are difficult to stain or paint, and which do not accurately simulate the look and feel of natural wood, leather, etc.

U.S. Pat. No. 4,676,041, issued June 30, 1981 discloses encapsulating a core wrapped in glass fiber with a liquid catalyzed resin material which impregnates the glass fibers and simultaneously forms the outer skin or shell of a door. In order to prevent fiber readout at the surface of the door, however, the walls of the mold are first coated with the same liquid catalyzed resin material. This is commonly referred to as a "gel coat" process, and insures that the surface of the molded plastic article is devoid of glass fibers.

U.S. Pat. No. 4,550,540, issued Nov. 5, 1985, discloses the use of sheet molding compound (SMC) for preparing a compression molded door.

Finally, U.S. Pat. No. 4,250,585 discloses a method for manufacturing a water ski, by polymerizing liquid reactive components adjacent a sheet of aluminum within a mold. The formed plastic hull of the ski is mechanically adhered to the aluminum deck, and contains reinforcing elements throughout.

SUMMARY OF THE INVENTION

Accordant with the present invention, there has surprisingly been discovered a process for producing a molded composite, useful for manufacturing for example entry way doors, furniture components, and architectural components, comprising the steps of:
(A) providing at least two cooperating mold sections having apposite surfaces which cooperate to define a mold cavity for forming the molded composite;
(B) positioning a substrate and a surface finishing film between the mold sections;
(C) closing the mold sections; and
(D) injecting polymeric precursors into the mold cavity between the substrate and the surface finishing film, the polymeric precursors filling the mold cavity and simultaneously deforming the surface finishing film to conform to one of the apposite surfaces of the mold, the polymeric precursors reacting in situ to form a polymeric layer and simultaneously chemically bonding to the surface finishing film.

The molded composites of the present invention are particularly suited for the manufacture of entry way doors, furniture components, and architectural components.

BRIEF DESCRIPTION OF THE DRAWINGS

The novel features, which are characteristic of the present invention, are set forth with particularity in the appended claims. The invention itself, however, both as to structure and process of manufacture, will best be understood from the accompanying description of specific embodiments, when read in connection with the attendant drawings, in which:

DETAILED DESCRIPTION OF THE PREFERRED EMBODIMENT

Figure 1:
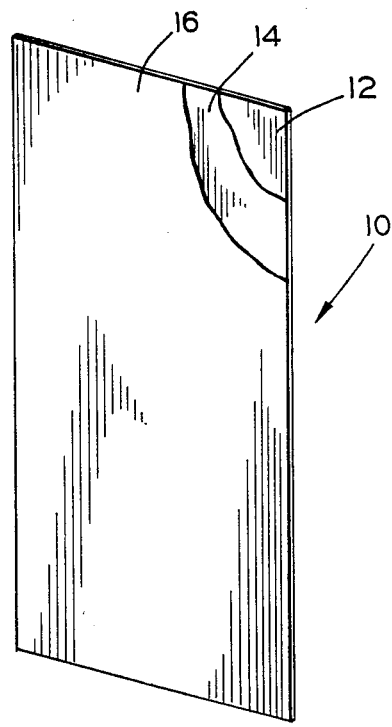
FIG. 1 is a perspective view of a molded composite in sheet form, embodying the features of the present invention.

Referring now to the drawings, and particularly to FIG. 1, there is shown generally at 10 a molded composite embodying the features of the present invention. FIG. 1 illustrates the molded composite 10 in sheet form, which may subsequently be formed into a shaped molded composite such as for example an entry way door, furniture component, or architectural panel. The sheet molded composite 10 comprises consecutively a substrate 12, a layer of reactive molded polymeric material 14 bonded to the substrate 12, and a surface finishing film 16 chemically bonded to the layer of reactive molded polymeric material 14.

More specifically, the molded composite 10 is prepared by a reactive molding process in which a substrate and a surface finishing film are positioned in a mold cavity formed by closed cooperating mold sections, and thereafter liquid reactive polymeric precursors are injected between the substrate and film. As a result of the injection pressure and the autogenous pressure generated while curing, the polymeric precursors form a polymeric layer which tenaciously bonds to the substrate, deforms the surface finishing film into intimate contact with a portion of the mold cavity surface, and simultaneously chemically bonds the surface finishing film to the curing polymeric layer.

Figure 2:
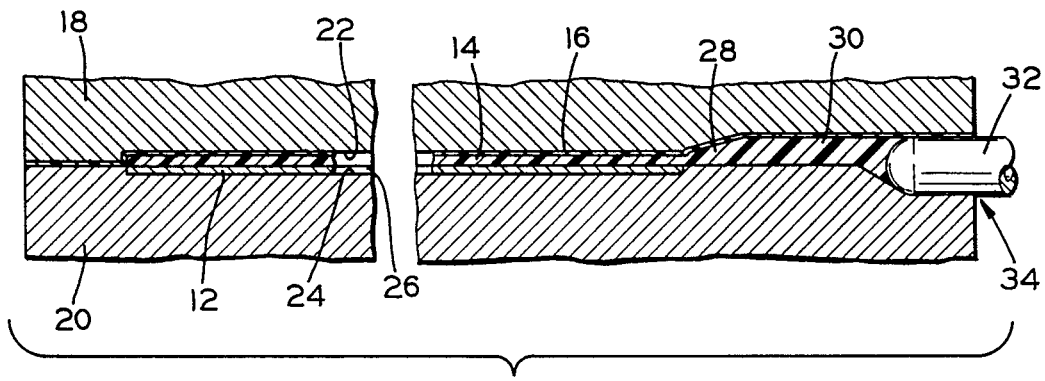
FIG. 2 is a fragmentary sectional view of a mold for preparing the molded composite of FIG. 1, illustrating the placement of the sheet-like substrate and surface finishing film within the mold cavity during the injection of the polymeric precursors.

As illustrated in FIG. 2, a typical mold for preparing the sheet molded composite 10 of FIG. 1 includes cooperating upper and lower mold sections 18 and 20, and means (not shown) for suitably moving the mold sections 18 and 20 toward and away from each other to close and open the mold. The mold sections 18 and 20 have apposite surfaces 22 and 24, respectively, which together define a mold cavity 26 shown in a broken section in FIG. 2 for purposes of clarity and illustration. A portion of the mold section surfaces 22 and 24 defines a mold cavity surface adjacent which a finished surface of the molded composite 10 is to be formed. As illustrated in FIG. 2, the upper mold section surface 22 defines this mold cavity surface against which the surface finishing film 16 is conformed by the injection pressure and autogenous pressure generated incident to the curing of the polymeric precursors.

The mold cavity 26 communicates with an inlet means or gate 28 and associated mixing chamber 30 for receiving polymeric precursors from a mixing head injection tip 32. Corresponding depressions within the mold sections 18 and 20 define a port 34 for receiving the mixing head injection tip 32, allowing it to communicate with the mixing chamber 30, thereby providing a path for injecting polymeric precursors between the surface finishing film 16 and the sheet-like substrate 12 which is positioned into the mold cavity 26 before the mold is closed.

The process of the present invention may conveniently be practiced by initially placing the substrate 12 into the mold cavity 26 while the mold sections 18 and 20 are separated in their open position (not shown).

Thereafter, the surface finishing film 16 is disposed between the mold sections 18 and 20, and positioned adjacent the upper mold surface 22 which will define the finished surface of the sheet molded composite 10. The finished surface of the molded composite 10, as the term is used herein, means the visibly exposed surface of the surface finishing film 16 on the ultimately produced molded composite 10.

Next, the mold is closed as is illustrated in FIG. 2, and polymeric precursors are injected into the mold cavity 26 between the surface finishing film 16 and the sheet-like substrate 12. The injection pressure and the autogenous pressure generated during the curing of the polymeric precursors within the mold cavity 26, together urge the surface finishing film 12 into intimate contact with the upper mold surface 22. The pressures of injection and curing aid in establishing the tenacious mechanical bonding between the cured polymeric layer 14 and the substrate 12, and also the superior chemical bonding between the cured polymeric layer 14 and the surface finishing film 16.

Upon completion of the curing of the polymeric precursors, the sheet molded composite 10 may be removed from the mold, and the excess surface finishing film may be trimmed away from the perimeter of the composite 10 by any suitable cutting technique.

The sheet molded composite 10 may subsequently be formed into panels for producing entry way doors, furniture components, architectural components, and the like, by conventional methods such as for example stamping or pressing, without causing delamination between the substrate 12 and polymeric layer 14, or the polymeric layer 14 and the surface finishing film 16. This is possible because of the superior bonding which occurs between each layer as a result of the injection and autogenous pressures incident to the reactive molding process of the present invention.

Figure 3:
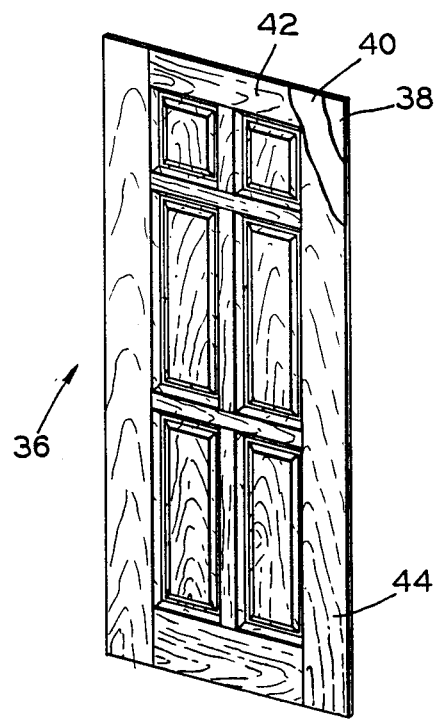
FIG. 3 is a perspective view of a molded composite formed as a panel for the manufacture of an entry way door.

In another embodiment, the process of the present invention may be used to prepare a formed molded composite 36, such as that illustrated in FIG. 3, which is suitable for use in the manufacture of an entry way door. Other formed molded composites may be used for example for furniture components or building decorative or structural components. The formed molded composite 36 comprises consecutively a substrate 38, a layer of reactive molded polymeric material 40 bonded to the substrate 38, and a surface finishing film 42 chemically bonded to the reactive molded polymeric material 40. Furthermore, the formed molded composite 36 may be manufactured so as to present a simulated natural wood grain appearance as shown at 44.

Figure 4:
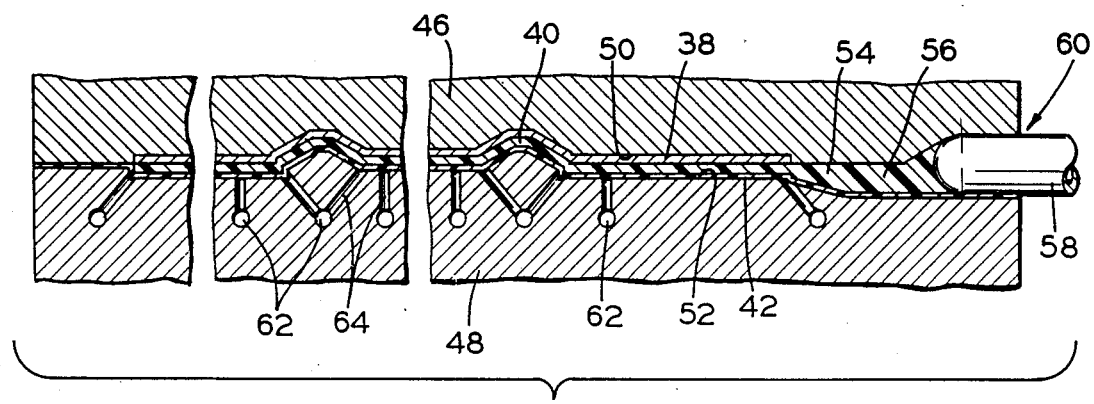
FIG. 4 is a fragmentary sectional view of a mold for preparing the molded composite of FIG. 2, illustrating the disposition of the formed substrate and surface finishing film within the mold cavity during the injection of the polymeric precursors.

FIG. 4 illustrates a mold structure for producing the formed molded composite 36 of FIG. 3, including cooperating upper and lower mold sections 46 and 48, and means (not shown) for moving the mold sections 46 and 48 toward and away from each other, to close and open the mold. The mold sections 46 and 48 have apposite surfaces 50 and 52, respectively, which together define a mold cavity. A portion of the mold section surfaces 50 and 52 defines a mold cavity surface adjacent which a finished surface of the molded composite 36 is to be formed. As illustrated in FIG. 4, the lower mold section surface 52 defines this mold cavity surface, against which the surface finishing film 42 is conformed by the injection pressure and the autogenous pressure generated during the curing of the polymeric precursors.

The mold cavity communicates with an inlet means or gate 54 and associated mixing chamber 56 for receiving polymeric precursors from a mixing head injection tip 58. Corresponding depressions within the mold sections 46 and 48 define a port 60 for receiving the mixing head injection tip 58, allowing it to communicate with the mixing chamber 56, thereby providing a path for injecting polymeric precursors between the surface finishing film 42 and the formed substrate 38.

The process of the present invention, as illustrated in FIG. 4, is practiced by initially disposing the surfaces finishing film 42 between the mold sections 46 and 48, adjacent the lower mold surface 52 which will define the finished surface of the formed molded composite 36.

Next, means to conform the surface finishing film 42 to substantially the configuration of the lower mold surface 52 is employed, FIG. 4 illustrates the use of vacuum means, whereby the mold section 48 is provided with conduits 62 selectively coupled to a vacuum source (not shown). The conduits 62 in turn communicate with a series of passageways 64 spaced along and opening to the lower mold surface 52. These openings to the lower mold surface are sufficiently small so that their effect on the finished surface of the molded composite 36 will be substantially nondetectable to the unaided eye. With the surface finishing film 42 lying adjacent the lower mold surface 52, application of a vacuum through the conduits 62 and associated passageways 64 will draw the surface finishing film 42 into substantial conformity with and against the lower mold surface 52. Methods for vacuum forming a plastic film into a mold cavity, utilizing a vacuum source coupled to a manifolded series of conduits and passageways, are well known in the art.

Thereafter, the formed substrate 38 is positioned in the mold cavity, and the mold is closed. As shown in FIG. 4, the polymeric precursors are injected into the mold cavity between the surface finishing film 42 and the formed substrate 38. The injection pressure, and the autogenous pressure generated during the curing of the polymeric precursors within the mold cavity, together urge the surface finishing film 42 into intimate contact with the lower mold surface 52. Likewise, the pressures of injection and curing aid in establishing the tenacious mechanical bonding between the cured polymeric layer 40 and the substrate 38, and superior chemical bonding between the cured polymeric layer 40 and the surface finishing film 42.

Upon completion of the curing of the polymeric precursors, the formed molded composite 36 may be removed from the mold, and the excess surface finishing film may be trimmed away from the perimeter of the composite 36 by any suitable cutting technique.

Figure 5:
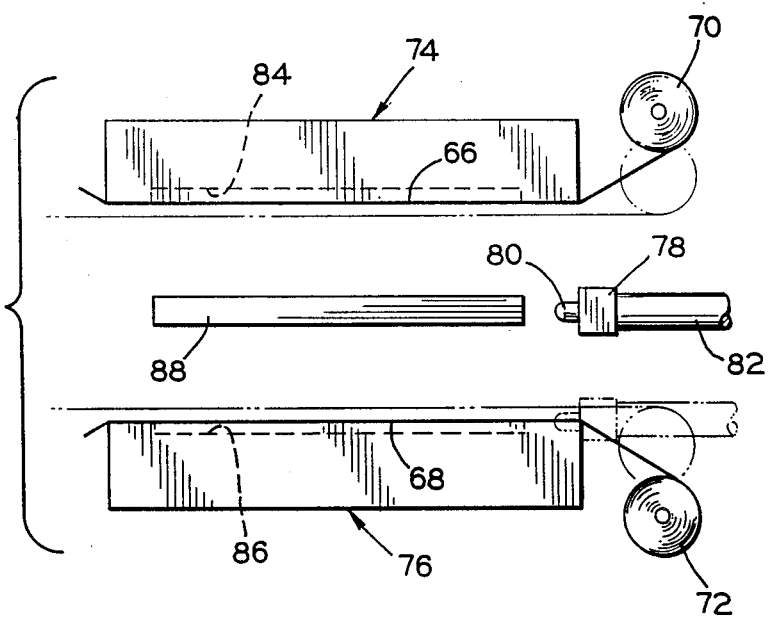
FIG. 5 is a schematic illustration of an embodiment of the present invention, showing the use of the surface finishing film in substantially the entire mold cavity.

FIG. 5 illustrates another embodiment of the process of the present invention, wherein surface finishing films 66 and 68 are employed in both halves of a two section mold. Thus, there are shown supply rolls 70 and 72 from which the surface finishing films 66 and 68, respectively, are drawn across the upper and lower mold sections 74 and 76, respectively. Of course, the surface finishing films 66 and 68 may alternatively be disposed over one or all of the mold sections 74 and 76 in the form of individual sheets of the film material. Also illustrated is a vertically movable positively controlled mixing head 78 having an injection tip 80 and connected to a control arm 82. The control arm 82 is adapted to move vertically by conventional mechanical means (not shown), from a first position between the spaced-apart mold sections 74 and 76, as illustrated by solid lines in FIG. 5, to a second position indicated by broken lines wherein the tip 80 is received into the port formed by corresponding depressions within the upper and lower mold sections 74 and 76 when the mold is closed by conventional mechanical means (not shown).

In operation, the surface finishing films 66 and 68 are drawn over the mold sections 74 and 76, as shown by the broken lines in FIG. 5. Thereafter, the supply rolls 70 and 72 and the surface finishing films 66 and 68 are repositioned so as to cause the surface finishing films to contact against the upper and lower mold sections 74 and 76, respectively, as illustrated by solid lines in FIG. 5. The surface finishing films 66 and 68 are then conformed to substantially the configuration of the mold cavity surface defined by upper and lower mold surfaces 84 and 86, respectively. The step of conforming the surface finishing films 66 and 68 to the mold surfaces 84 and 86, respectively, may be accomplished utilizing a vacuum as illustrated in FIG. 4. Thereafter, as shown in FIG. 5, a substrate 88 is placed into the mold cavity. The upper and lower mold sections 74 and 76 are brought together, and simultaneously, the positively controlled mixing head 78 is moved to the position indicated by broken lines in FIG. 5, such that the tip 80 is enclosed by the port formed as the corresponding depressions in the mold section 74 and 76 are brought together.

The closed mold thereafter contains surface finishing films 66 and 68, positioned substantially adjacent the mold surfaces 84 and 86, respectively, which form the mold cavity. The substrate 88 is enclosed within the surface finishing films 66 and 68. The positively controlled mixing head tip 80 is positioned so as to permit the injection of polymeric precursor materials into the mold cavity, between the surface finishing films 66 and 68. As the polymeric precursor materials are injected into the mold cavity to surround the substrate 88, and during the cure of the injected polymeric precursors, the surface finishing films 66 and 68 are further urged into intimate contact with the mold surfaces 84 and 86, respectively. Simultaneously the polymeric layer formed by the curing polymeric precursors chemically bonds to the surface finishing films 66 and 68 and adheres to the substrate 88, aided by the injection pressure and autogenous pressure generated incident to the polymerization of the polymeric precursors.

Substrates which are useful for the practice of the present invention include, but are not limited to, non-metallic materials such as, for example: wood, cellulosic composites, plastics, and the like, as well as metallic materials including low carbon steel, stainless steel, aluminum, copper, brass, bronze, zinc, and alloys thereof. Preferred substrates are low carbon steel, stainless steel, aluminum, and alloys thereof. These materials are easily formed by conventional methods, and are routinely utilized as structural components, in entry way doors, furniture components, architectural components, and the like. The substrates useful for the present invention may vary greatly in thickness, but generally have thicknesses commonly known in the art as imparting structural integrity to composite structures.

Suitable polymeric precursors for manufacturing the molded composites of the present invention include polyurethane precursors of the type typically employed in reaction injection molding (RIM). These precursors include isocyanates, such as for example methylene-di-p-phenylene isocyanate and toluene diisocyanates, and polyols which preferably are either polyether polyols or polyester polyols. Generally the polyurethane precursors also include various chain extenders and curing agents such as for example diamine compounds either alone or in various blends. Polyurethane precursors typically comprise a two-part composition that is mixed just prior to or upon injection into a mold cavity, so that all or substantially all of the reaction occurs within the mold cavity after injection. One component comprises the isocyanate, and the other component comprises the polyol, chain extender, curing agent, and optional additives. Specific methods for preparing polyurethane precursors useful for the present invention are more fully set forth in U.S. Pat. Nos. 4,218,543 and 4,269,945, which are hereby incorporated in their entirety by reference thereto.

Additionally suitable polymeric precursors include those used to prepare polyamides. These include mono-aminomonocarboxylic acids, or internal lactams thereof, as well as substantially equimolar mixtures of diamines and dicarboxylic acids. Examples of a convenient monoaminomonocarboxylic acid and lactim are epsilonaminocaproic acid and caprolactam. Suitable diamines include hexamethylenediamine and tetramethylenediamine. Useful dicarboxylic acids include adipic acid and glutaric acid. Processes for preparing polyamides utilizing these as well as other precursors are thoroughly disclosed in "Polyurethanes Chemistry and Technology", Robert E. Krieger Publishing Company, Inc., Malabar, Fla. (1983).

Other suitable polymeric precursors include, but are not limited to, crosslinkable polyester and epoxy resins, which are typically employed in reactive molding processes. The polyester resins generally comprise unsaturated polyesters dissolved in a polymerizable ethylenically unsaturated monomer such as for example styrene, and a crosslinking initiator. Useful epoxy resins generally comprise ethers containing the epoxide group and aliphatic polyols, which together cure readily in the presence of amine catalysts. Processes for preparing crosslinkable polyester and epoxy resins are more fully set forth in E. E. Schildknecht, "Polymer Process", vol. X, Interscience Publishers (1956).

The polymeric precursors may additionally contain conventional adjuvants, such as for example blowing agents, fillers, thermal stabilizers, dyes, flame retardants, pigments, plasticizers, antistatic agents, ultraviolet ray absorbers, lubricants, and the like.

Preferred polymeric precursors are those used to prepare polyurethanes.

Suitable materials which may be satisfactorily employed for the surface finishing films described earlier in the description of the invention include, but are not limited to, acrylic polymers such as for example polyacrylamide, polyacrylic acid, polymethyl methacrylate, polyacrylonitrile, etc., as well as polyvinyl chloride, polyethylene, polyesters, polyurethanes, polyvinylidene chloride, polyvinyl acetate, polypropylene, and the like., as well as copolymers thereof. Also contemplated by the term surface finishing film, as equivalent in operability and utility, are laminated and coextruded multilayered films prepared from the polymers disclosed hereinabove. The thickness of the surface finishing film material is conveniently in the range from about 0.5 to about 15 mils. These film materials are well known in the polymeric film art, and are commercially available. Preferred surface finishing films are prepared from acrylic polymers and polyvinyl chloride, and have a thickness in the range from about 3 to about 4 mils.

In some cases, it is beneficial to treat the surface finishing film, prior to its use in the process of the present invention, to enhance the bonding thereof to the cured polymeric precursors. Specifically, the surface of the film which is to be bonded to the cured polymeric precursors may be treated such as for example by corona discharge, plasma discharge, flame treatment or the application of a primer such as gamma-methacryloxypropyltrimethoxysilane Likewise, it may be beneficial to treat the surface of the substrate, to enhance the bonding of the cured polymeric precursors thereto. Suitable treatments include abrading the surface or applying a primer such as for example gamma-methacryloxypropyltrimethoxysilane.

Most surface finishing films will readily conform to the mold cavity surface, upon injection of the polymeric precursors. In those instances where it may be desirable to deform the surface finishing film prior to the introduction of the polymeric precursors, alternative means may be employed to conform the film to substantially the configuration of the mold cavity surfaces. For example, jets of heated air may be directed toward the surface finishing film, after it is disposed between the mold sections, to impinge against the film and cause it to be urged into intimate contact with the configured surface of the interior of the mold sections. Also, the mold section itself may be heated to cause the associated film, when brought into close proximity to the hot mold section, to sag under its own weight onto the configured surface of the mold section. Moreover, where a formed substrate having a very high aspect ratio is utilized in the reactive molding process, the substrate may simply be laid on the surface finishing film thereby causing the film to sag into the associated mold cavity. Finally, a combination of "assists", including any or all of the methods discussed hereinabove, may be used to conform the surface finishing film to substantially the configuration of the mold surface.

One of the keys to the superior performance of the molded composites of the present invention is the chemically reactive nature of the molding process. The reactive molding process utilizes two separate polymeric precursor liquids, or a simple polymeric precursor liquid containing a catalyst. The material is injected into the mold cavity, under conditions to insure good mixing. The surface finishing film bonds, both through covalent and non-covalent bonds, with the chemically reactive sites in the curing polymeric layer. Additionally, the reactive molding process results in a particularly tenacious bond between the polymeric layer and the substrate. These bonding characteristics provide extremely high levels of adhesion between the molded composite layers, such that subsequent metal working operations, such as for example stamping and pressing, will not cause delamination, as may generally be experienced by other polymer/metal composites prepared by other than the present inventive process.

The very low viscosity and surface tension characteristics of polyurethane precursors, according to a preferred embodiment of the present invention, serve to enhance the bonding integrity. The low viscosity polyurethane reactive precursors flow easily through the mold cavity, and are able to more effectively wet the surface finishing film and substrate. However, higher viscosity polymeric precursors are nearly as effective for producing excellent bonding between the layers of the composite.

The process of the present invention is particularly suited for preparing molded composites having a simulated natural wood grain surface, which may be accomplished by preparing the mold cavity surface so as to have a wood grain texture. The wood grain pattern is conveniently etched into the mold cavity surface, thereby imparting the pattern to the finished surface of the molded composite. Moreover, the surface finishing films of the present invention are particularly capable of accepting a conventional wood stain or paint. The molded composites of the present invention have texture and warmth qualities, as well as insulating and sound-deadening characteristics, similar to natural wood. Moreover, other textures such as leather may be simulated by the process of the present invention.

The invention is more easily comprehended by reference to the specific embodiments contained herein, which are representative of the invention. It must be understood, however, that these specific embodiments are provided only for the purposes of illustration and understanding, and that the invention may be practiced otherwise than as specifically illustrated without departing from its spirit and scope.

What is claimed is:

1. A process for preparing a molded composite, comprising the steps of:
    (A) providing at least two cooperating mold sections having surfaces which cooperate to define a mold cavity for molding the composite;
    (B) positioning a layer of a surface finishing film adjacent each of the surfaces of the mold sections;
    (C) positioning a substrate between the mold sections and intermediate the layers of surface finishing film;

(D) closing the mold sections; and
(E) injecting polymeric precursors into the mold cavity between the substrate and the layers of surface finishing film so as to form a layer of polymeric precursors between apposing major surfaces of the substrate and the layers of surface finishing film, the polymeric precursors filling the mold cavity and simultaneously deforming the layers of surface finishing film to conform to the surfaces of the mold sections, the polymeric precursors reacting in situ to form a polymeric layer and simultaneously chemically bond the polymeric layer to the layers of surface finishing film.

2. The process for preparing a molded composite, according to claim 1, wherein the substrate is selected from the group consisting of low carbon steel, stainless steel, aluminum, and alloys thereof.

3. The process for preparing a molded composite, according to claim 1, wherein the polymeric precursors are those suitable for preparing polyurethanes.

4. The process for preparing a molded composite, according to claim 1, wherein the surface finishing film is selected from the group consisting of acrylic polymers and polyvinyl chloride, and copolymers and laminates thereof.

5. The process for preparing a molded composite, according to claim 1, wherein the surface finishing film has a thickness from about 3 to about 4 mils.

6. The process for preparing a molded composite, according to claim 1, wherein the surface finishing film is treated to enhance its bonding to the polymeric layer.

7. The process for preparing a molded composite, according to claim 1, wherein the substrate is treated to enhance its bonding to the polymeric layer.

8. The process for preparing a molded composite, according to claim 1, wherein at least one of the apposite surfaces of the mold has a wood grain texture to impart a simulated wood grain surface to the finished surface of the molded composite.

9. The process for preparing a molded composite, according to claim 1, further comprising the steps:
(F) opening the mold sections; and
(G) removing the molded composite from the mold cavity.

10. A process for preparing a molded composite, comprising the steps of:
(A) providing at least two cooperating mold sections having surfaces which cooperate to define a mold cavity for molding the composite;
(B) positioning a layer of a surface finishing film adjacent each of the surfaces of the mold sections;
(C) conforming the layers of surface finishing film to substantially the configuration of the mold cavity surface;
(D) placing a substrate into the mold cavity, intermediate the layers of surface finishing film;
(E) closing the mold sections; and
(F) injecting polymeric precursors into the mold cavity between the substrate and the layers of surface finishing film so as to form a layer of polymeric precursors between apposing major surfaces of the substrate and the layers of surface finishing film, the polymeric precursors filling the mold cavity and simultaneously deforming the layers of surface finishing film to conform to the surfaces of the mold sections, the polymeric precursors reacting in situ to form a polymeric layer and simultaneously chemically bond the polymeric layer to the layers of surface finishing film.

11. The process for preparing a molded composite, according to claim 10, wherein step C includes applying a vacuum to the mold cavity surface.

12. The process for preparing a molded composite, according to claim 10, wherein the substrate is selected from the group consisting of low carbon steel, stainless steel, aluminum, and alloys thereof.

13. The process for preparing a molded composite, according to claim 10, wherein the polymeric precursors are those suitable for preparing polyurethanes.

14. The process for preparing a molded composite, according to claim 10, wherein the surface finishing film is selected from the group consisting of acrylic polymers and polyvinyl chloride, and copolymers and multilayered laminates thereof.

15. The process for preparing a molded composite, according to claim 10, wherein the surface finishing film has a thickness from about 3 to about 4 mils.

16. The process for preparing a molded composite, according to claim 10, wherein the surface finishing film is treated to enhance its bonding to the polymeric layer.

17. The process for preparing a molded composite, according to claim 10, wherein the substrate is treated to enhance its bonding to the polymeric layer.

18. The process for preparing a molded composite, according to claim 10, wherein at least one of the apposite surfaces of the mold has a wood grain texture to impart a simulated wood grain surface to the finished surface of the molded composite.

19. The process for preparing a molded composite, according to claim 10, further comprising the steps of:
(G) opening the mold sections; and
(H) removing the molded composite from the mold cavity.

20. A process for preparing a formed, molded composite, comprising the steps of:
(A) providing at least two cooperating mold sections having surfaces which cooperate to define a mold cavity for molding the composite;
(B) positioning a substrate and a surface finishing film between the mold sections;
(C) closing the mold sections;
(D) injecting polymeric precursors into the mold cavity between the substrate and the surface finishing film so as to form a layer of polymeric precursors between apposing major surfaces of the substrate and the surface finishing film, the polymeric precursors filling the mold cavity and simultaneously deforming the surface finishing film to conform to a portion of the mold cavity, the polymeric precursors reacting in situ to form a polymeric layer and simultaneously chemically bond the polymeric layer to the surface finishing film;
(E) opening the mold sections;
(F) removing the molded composite from the mold cavity; and
(G) forming the molded composite, without delaminating the polymeric layer from the substrate nor the surface finishing film from the polymeric layer.

21. The process for preparing a formed, molded composite according to claim 20, wherein the substrate is selected from the group consisting of low carbon steel, stainless steel, aluminum, and alloys thereof.

22. The process for preparing a formed, molded composite according to claim 20, wherein the polymeric precursors are those suitable for preparing polyurethanes.

23. The process for preparing a formed, molded composite according to claim 20, wherein the surface finishing film is selected from the group consisting of acrylic polymers and polyvinyl chloride, and copolymers and laminates thereof.

24. The process for preparing a formed, molded composite according to claim 20, wherein the surface finishing film has a thickness from about 3 to about 4 mils.

25. The process for preparing a formed, molded composite according to claim 20, wherein the surface finishing film is treated to enhance its bonding to the polymeric layer.

26. The process for preparing a formed, molded composite according to claim 20, wherein the substrate is treated to enhance its bonding to the polymeric layer.

27. The process for preparing a formed, molded composite according to claim 20, wherein at least one of the apposite surfaces of the mold has a wood grain texture to impart a simulated wood grain surface to the finished surface of the molded composite.

* * * * *